United States Patent
Kaplanis et al.

(10) Patent No.: US 12,205,559 B2
(45) Date of Patent: Jan. 21, 2025

(54) VIDEO SIGNAL CLASSIFICATIONS

(71) Applicant: Hewlett-Packard Development Company, L.P., Spring, TX (US)

(72) Inventors: Anthony Nicholas Kaplanis, Spring, TX (US); Alexander Morgan Williams, Spring, TX (US); Gregory Gore Staten, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/560,599

(22) PCT Filed: May 20, 2021

(86) PCT No.: PCT/US2021/033468
§ 371 (c)(1),
(2) Date: Nov. 13, 2023

(87) PCT Pub. No.: WO2022/245362
PCT Pub. Date: Nov. 24, 2022

(65) Prior Publication Data
US 2024/0249702 A1    Jul. 25, 2024

(51) Int. Cl.
G09G 5/14         (2006.01)
G06F 3/01         (2006.01)
G06F 3/14         (2006.01)
G06V 20/40        (2022.01)

(52) U.S. Cl.
CPC ............. *G09G 5/14* (2013.01); *G06F 3/011* (2013.01); *G06F 3/14* (2013.01); *G06V 20/41* (2022.01); *G09G 2340/0407* (2013.01); *G09G 2340/0464* (2013.01); *G09G 2354/00* (2013.01)

(58) Field of Classification Search
CPC ............. G09G 5/14; G09G 2340/0407; G09G 2340/0464; G09G 2354/00; G06F 3/011; G06F 3/14; G06V 20/41
See application file for complete search history.

(56) References Cited

U.S. PATENT DOCUMENTS

| | | | |
|---|---|---|---|
| 9,998,664 B1 * | 6/2018 | Long | H04N 13/189 |
| 2009/0147139 A1 * | 6/2009 | Watanabe | H04N 21/84 |
| | | | 348/E5.099 |
| 2017/0307735 A1 | 10/2017 | Rohani et al. | |
| 2018/0027204 A1 * | 1/2018 | Kim | H04N 7/10 |
| | | | 348/734 |
| 2018/0139332 A1 * | 5/2018 | Kerzner | G08B 21/0476 |
| 2019/0265017 A1 | 8/2019 | Guo et al. | |

* cited by examiner

*Primary Examiner* — Jonathan A Boyd
(74) *Attorney, Agent, or Firm* — Quarles & Brady LLP

(57) ABSTRACT

In some examples, a method includes determining a context indicating a displayed media type based on a received first video signal. In some examples, the method includes classifying a received second video signal to produce a classification of the received second video signal indicating a media type of the received second video signal. In some examples, the method includes determining size and location settings based on the context and the classification. In some examples, the method includes using the size and location settings to cause the second video signal to be presented on a display.

17 Claims, 4 Drawing Sheets

VIDEO SIGNAL CLASSIFICATIONS

BACKGROUND

The use of electronic devices has expanded. Some electronic devices include electronic circuitry for performing processing. As processing capabilities have expanded, electronic devices have been utilized to perform more functions. For example, a variety of electronic devices are used for work, communication, and entertainment. Electronic devices may be linked to other devices and may communicate with other devices.

DETAILED DESCRIPTION

Figure 1:
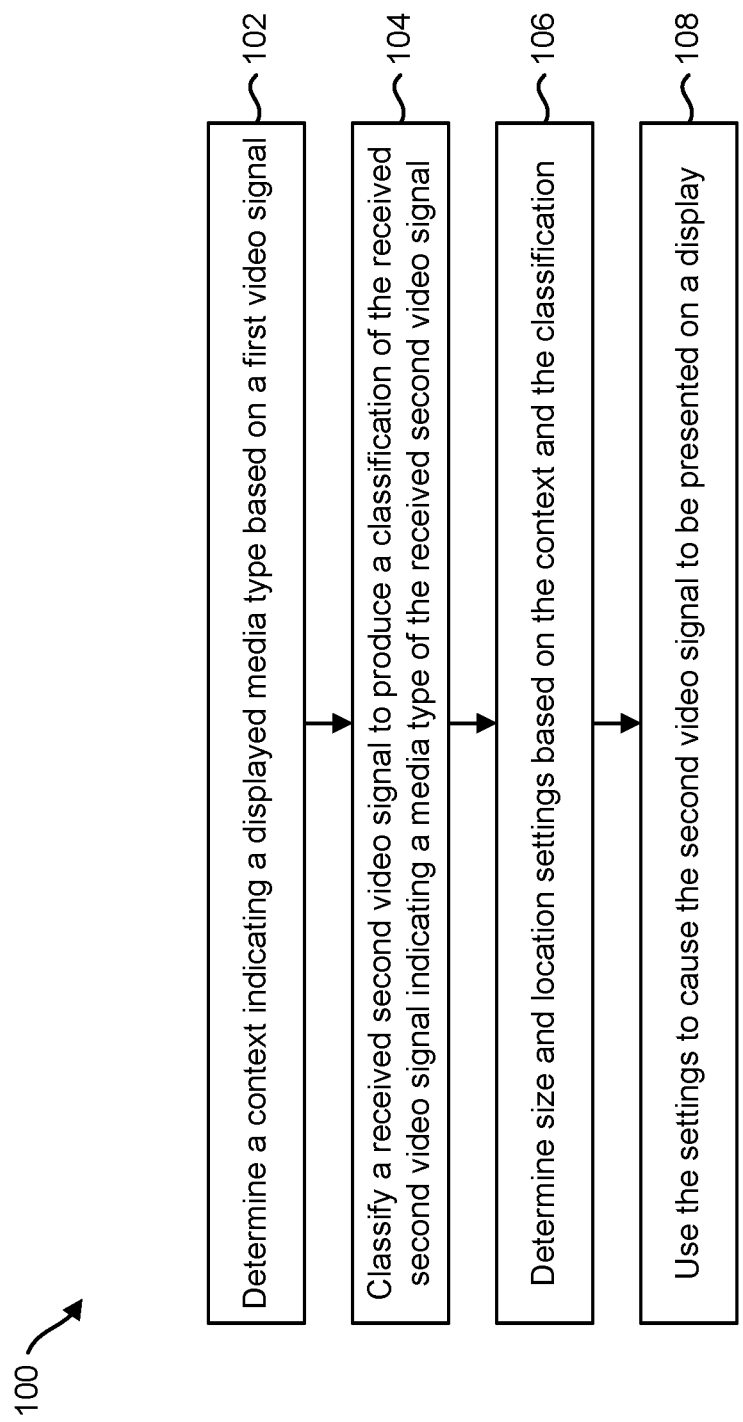
FIG. 1 is a flow diagram illustrating an example of a method for video signal classification.

Some electronic devices (e.g., display devices, monitors, televisions (TVs), computers, etc.) may utilize video signals from multiple sources. It can be a challenge to manage video signals from multiple source devices such as a mobile device (e.g., smartphone, tablet, etc.), a computer, a smart home voice assistant, a video doorbell, a security system, and/or other source devices. Some of the techniques described herein may provide video signal content awareness to determine how to display or "pin" content from different sources. For instance, an electronic device (e.g., display device, monitor, computer, etc.) may make intelligent decisions based on video signal content and user input to display multiple video signals in picture-by-picture mode or picture-in-picture mode.

An electronic device is a device that includes electronic circuitry (e.g., integrated circuitry, a chip(s), etc.). Examples of electronic devices may include docks, monitors, televisions, display devices, display panels, graphics cards, graphics processing units (GPUs), motherboards, computing devices, smartphones, tablet devices, game consoles, video doorbells, cameras, security systems, smart speakers, voice assistants, etc. Some examples of electronic devices may utilize circuitry (e.g., controller(s) and/or processor(s), etc.) to perform an operation or operations. In some examples, electronic devices may execute instructions stored in memory to perform the operation(s). Instructions may be code and/or programming that specifies functionality or operation of the circuitry. In some examples, instructions may be stored in non-volatile memory (e.g., Read-Only Memory (ROM), Erasable Programmable Read-Only Memory (EPROM), Electrically Erasable Programmable Read-Only Memory (EEPROM), flash memory, etc.). In some examples, different circuitries in an electronic device may store and/or utilize separate instructions for operation.

In some examples, an electronic device may be linked to another electronic device or devices using a wired link. For example, an electronic device (e.g., display device, monitor, television, etc.) may include a wired communication interface (e.g., connector or connectors) for connecting electronic devices. Connectors are structures that enable forming a physical and/or electrical connection. For instance, a connector may be a port, plug, and/or electrical interface, etc. A connector or connectors may allow electronic devices to be connected with a cable or cables. Examples of connectors include DisplayPort™ (DP) connectors, High-Definition Multimedia Interface (HDMI®) connectors, Universal Serial Bus (USB) connectors, Lightning® connectors, Digital Visual Interface (DVI) connectors, OCuLink connectors, Ethernet connectors, etc.

In some examples, an electronic device may be linked to another electronic device with a wireless link. For instance, an electronic device (e.g., display device, monitor, television, etc.) may include a wireless communication interface to send and/or receive wireless (e.g., radio frequency (RF)) signals. Examples of wireless communication interfaces may include an Institute of Electrical and Electronics Engineers (IEEE) 802.11 (Wi-Fi) interfaces, Bluetooth interfaces, cellular (e.g., 3G, Long-Term Evolution (LTE), 4G, 5G, etc.) interfaces, etc.

A link between electronic devices may be a direct link (e.g., without an intervening device) or an indirect link (e.g., with an intervening device or devices). For instance, a link may be established between electronic devices over a network using a hub(s), repeater(s), splitter(s), router(s), and/or switch(es), etc.

In some examples, an electronic device may be linked to another electronic device to communicate a video signal. For instance, when the electronic devices are linked (e.g., a cable is plugged into both electronic devices and/or wireless communication is set up between electronic devices), the electronic devices may follow a protocol or protocols to set up a video link. A video link is a communication channel for video. For instance, a video link may carry a video stream (e.g., data corresponding to a series of video frames with or without audio) from one electronic device to another. A video link may include a physical and/or logical aspect or aspects. For instance, a video link may be set up when a cable is physically connected and/or a protocol condition or conditions are satisfied to enable video stream communication. In some examples, setting up a video link may be referred to as enumerating a display. As used herein, a "source device" is an electronic device for sending video and a "sink device" is an electronic device for receiving video. In some examples, an electronic device may be a source device or a sink device. In some examples, an electronic device (e.g., hub, daisy-chained monitor, etc.) may be source device and a sink device.

In some examples, setting up a video link (e.g., enumerating a display) may follow a protocol. For instance, a protocol may include a sequence of messages and/or functions to set up the video link. In some examples, DP video link setup may include hot plug detection (HPD), display identification (DisplayID) and/or extended display identification data (EDID) read, DisplayPort configuration data (DPCD) read, link training, and/or video stream output. In some examples, HDMI video link setup may include HPD, DisplayID, and/or EDID read, and/or video stream output. Video link setup may vary based on the protocol(s) utilized and/or type of connection. For instance, video link setup for some protocols may utilize a connection detection signal (e.g., HPD signal) and display data (e.g., DisplayID and/or EDID) without other setup data (e.g., DPCD) and/or without link training. In some examples, video link setup for another protocol may utilize a connection detection signal (e.g., HPD signal), display data (e.g., DisplayID and/or EDID), setup data (e.g., DPCD) and/or link training. Some of the data described herein (e.g., display data, setup data, validity data, etc.) may be requested, sent, and/or received. For instance, an electronic device may request, send, and/or receive some of the signaling and/or data (e.g., HPD signal, DisplayID, EDID, and/or DPCD, etc.) described herein during detection, setup, and/or enumeration procedures.

HPD is a procedure where a signal (e.g., voltage, current, signal pattern, HPD signal, etc.) is sent or provided from one electronic device to another electronic device to indicate that a physical connection is made. For instance, a display may send or provide a signal to a GPU indicating that a physical connection is made between the display and the GPU.

In some examples, display data read may be a procedure where DisplayID and/or EDID is sent from one electronic device to another electronic device. Display data is data indicating a characteristic or characteristics of a display. For instance, DisplayID and/or EDID may include data indicating a manufacturer identifier (e.g., name), serial number, display size, supported timing(s), resolution(s) device type, and/or another characteristic or characteristics, etc. In some examples, a sink device may send the DisplayID and/or EDID to a source device to indicate a capability or capabilities of (e.g., video stream format(s) that can be displayed by) the sink device.

In some examples, DPCD read may be a procedure where DPCD is sent from one electronic device to another electronic device. DPCD is data for a DP link. For instance, DPCD may include data indicating supported lane(s), supported bitrate(s), whether multi-touch is supported, repeater capability, and/or another characteristic or characteristics, etc. In some examples, a sink device may send the DPCD to a source device to indicate a capability or capabilities of the sink device for a DP link.

In some examples, link training may be a procedure where information is exchanged between electronic devices to assess and/or adjust a link parameter or parameters. For instance, link training may include signaling video from a source device to a sink device, assessing link quality, sending link quality indicator(s) from the sink device to the source device, and/or sending a voltage adjustment request from the sink device to the source device and/or other assessment(s) and/or adjustment(s), etc. In some examples, a source device may adjust a link parameter or parameters (e.g., output signal voltage) in link training.

In some examples, video stream output may be a procedure where a video signal is output from a source device to a sink device. For instance, a source device may send a series of video frames and/or audio to a sink device.

Throughout the drawings, similar reference numbers may designate similar or identical elements. When an element is referred to without a reference number, this may refer to the element generally, with and/or without limitation to any particular drawing or figure. In some examples, the drawings are not to scale and/or the size of some parts may be exaggerated to more clearly illustrate the example shown. Moreover, the drawings provide examples in accordance with the description. However, the description is not limited to the examples provided in the drawings.

FIG. 1 is a flow diagram illustrating an example of a method 100 for video signal classification. The method 100 and/or a method 100 element(s) may be performed by an electronic device (e.g., source device, sink device, computer, GPU, hub, dock, and/or display, etc.). In some examples, the method 100 may be performed by a source device. In some examples, the method 100 may be performed by an electronic device (e.g., dock, hub, router, splitter, switch, etc.) coupled between a source device and sink device. In some examples, the method 100 may be performed by a sink device (e.g., display device). For instance, the method 100 may be performed by the display device 302 described in relation to FIG. 3.

An electronic device may determine 102 a context indicating a displayed media type based on a first video signal (e.g., a received first video signal). The first video signal may be produced by the electronic device or received from another electronic device. For example, the first video signal may be produced by a graphics card (e.g., graphics processing unit) included in an electronic device. In some examples, the first video signal may be received from another electronic device (e.g., a separate source device). For instance, a monitor, television, or computing device may receive the first video signal over a wired or wireless link from a computer, web server, video game console, DVD player, Blu-ray player, camera, doorbell camera, smartphone, tablet device, etc.

A context is data (e.g., an indicator) indicating an activity corresponding to a displayed video signal (e.g., a video signal that is currently being displayed). For example, a context may indicate a media type being actively displayed, how media is being produced (e.g., which application is producing the media), how media is being presented (e.g., displayed on a single monitor or multiple monitors), and/or how media is being consumed (e.g., a user proximity to a display showing the media).

A media type is a kind of media. For instance, a media type may indicate a media source and/or category. Examples of media types may include television shows and/or movies (e.g., streaming, video file playback, Netflix®, Amazon® video, Hulu®, Disney+®, Digital Versatile Disc (DVD®) playback, Blu-ray Disc® playback, etc.), video games (e.g., video game applications, Steam®, Epic Games®, etc.), productivity media (e.g., email, word processing, presentation applications, media production applications, etc.), communication content (e.g., video conferencing applications and/or media, virtual meeting applications, etc.), security applications (e.g., security camera feed display, video doorbell feed display, etc.), Internet content, social media, static content, dynamic content, etc. In some examples, a media type of media being actively displayed may be used as a representation of the context.

In some examples, a context may indicate an activity associated with a media type that is being actively displayed. Examples of activities associated with media types may include passive entertainment (e.g., a movie or show), active entertainment (e.g., a video game), productivity (e.g., using a word processor, using email, producing a video, etc.), monitoring a security feed (e.g., video doorbell feed, security camera feed, etc.), communicating (e.g., video call), etc.

In some approaches, media types may be categorized according to an application or applications used to present media (e.g., to present media on a display). For instance, determining 102 the context may be performed based on an application indicator or indicators. In some examples (where the method 100 may be performed on a computing device), a computing device may determine 102 the context by extracting an application indicator or indicators (e.g., task(s) and/or process(es)) from an operating system (OS) of the computing device. The application indicator(s) may be associated with (e.g., mapped to) the context. For instance, a computing device may use the application indicator as a representation of the context (e.g., streaming application, productivity application, etc.) and/or may look up the context based on the application indicator (e.g., "passive entertainment" associated with a streaming application). In some examples, the computing device may store a lookup table that associates that application indicator(s) to the context.

In some approaches, media types may be categorized according to a source device that provides the media. For instance, determining 102 the context may be performed based on a source device type and/or identifier. For example, the electronic device may read a source device type and/or identifier from memory or may receive a source device type and/or identifier from another electronic device (e.g., source device). For instance, the electronic device may receive an EDID and/or DisplayID from another electronic device during enumeration. In some examples, an electronic device (e.g., source device) may include and/or utilize an application programming interface (API) that may provide a source device type and/or identifier. The source device type and/or identifier may be associated with (e.g., mapped to) the context. For instance, the EDID for a video doorbell may be associated with a security feed context. The electronic device may look up the context based on the source device type and/or identifier (e.g., "active entertainment" associated with an Xbox® console). In some examples, the electronic device may store a lookup table that associates source device type(s) and/or identifier(s) to the context(s).

In some examples, an electronic device (e.g., computing device, monitor, etc.) may utilize a machine learning model or models to determine 102 a context. Machine learning is a technique where a machine learning model is trained to perform a task or tasks based on a set of examples (e.g., data). Training a machine learning model may include determining weights corresponding to structures of the machine learning model. Artificial neural networks are a kind of machine learning model that are structured with nodes, model layers, and/or connections. Deep learning is a kind of machine learning that utilizes multiple layers. A deep neural network is a neural network that utilizes deep learning.

Examples of neural networks include convolutional neural networks (CNNs) (e.g., basic CNN, deconvolutional neural network, inception module, residual neural network, etc.) and recurrent neural networks (RNNs) (e.g., basic RNN, multi-layer RNN, bi-directional RNN, fused RNN, clockwork RNN, etc.). Different depths of a neural network or neural networks may be utilized in accordance with some examples of the techniques described herein.

An electronic device may utilize a machine learning model that has been trained to detect objects in an image or images (e.g., video), and/or that has been trained to classify a scene depicted in an image or images (e.g., video). For instance, media types may be categorized according to content of the media. For example, video frames of the media and/or the object(s) and/or scene(s) of the media may indicate the media type. In some examples, media may be categorized into a media type based on whether text appears (e.g., email text, document text, etc.), whether an application interface or interfaces appear (e.g., whether a word processing application interface or a video playback interface is visible in the media, etc.), a scene depicted by the media (e.g., a static angle video of a front porch, etc.), etc. In some examples, the object(s) detected and/or the scene(s) that are classified may be utilized to determine 102 the context. For instance, a detected user interface of a particular application may be associated with a media type (e.g., productivity application) and/or context (e.g., work). In some examples, frequent scene changes (e.g., a number of scene changes that exceed a threshold) may be associated with a media type (e.g., movie or television show) and/or activity (e.g., passive entertainment). In some examples, detected heads-up display (HUD) objects may be associated with a media type (e.g., video games) and/or activity (e.g., active entertainment).

In some cases, there may be multiple media types, application indicators, and/or activities occurring concurrently (e.g., at the same time and/or in overlapping time frames). In some examples, the media types, application indicators, and/or activities may be ordered (e.g., ranked), and a highest-ranking media type, application indicator, and/or activity may be selected to determine the context. For instance, a productivity application may rank higher than a streaming application, and the productivity application may be utilized to determine the context. In another example, active entertainment may rank higher than productivity, and active entertainment may be selected as the context. In some examples, the ordering may be set based on a received input. For instance, a user may indicate an ordering or ranking of the media types, application indicators, and/or activities. For example, one ordering may rank a productivity application (or productivity activity) higher than a video game (or active entertainment activity), while another ordering may rank a video game higher than a productivity application. In some examples, a quantity of applications being executed (e.g., a number of application indicators) may be utilized to determine the context. For instance, if a quantity of application indicators corresponding to productivity applications is greater than a quantity of application indicators corresponding to entertainment applications, productivity media may be selected as the context.

In some examples, an electronic device (e.g., monitor) may receive the media type(s), application indicator(s), and/or activity(ies) from another electronic device (e.g., host computing device, source device, etc.). For instance, a host computing device may communicate the media type(s), application indicator(s), and/or activity(ies) to a monitor. The monitor may utilize the communication (e.g., media type(s), application indicator(s), and/or activity(ies)) to determine 102 the context.

The electronic device may classify 104 a received second video signal to produce a classification of the received second video signal indicating a media type of the received second video signal. The electronic device may receive a second video signal from another electronic device (e.g., second source device). For instance, a monitor, television, or computing device may receive the second video signal over a wired or wireless link from a computer, web server, video game console, DVD player, Blu-ray player, camera, doorbell camera, smartphone, tablet device, etc.

A classification is data (e.g., an indicator) indicating a media type of a video signal to be displayed. For example, a second video signal may be received for display while the first video signal is being displayed. A classification may indicate a media type corresponding to the second video signal. In some examples, the second video signal may not be displayed initially. For example, the context may be associated with the first video signal (e.g., currently displayed video, current activity, etc.), and the classification may be associated with the second video signal. In some examples, the classification may be determined before the second video is displayed. For example, a monitor may classify the second video signal before displaying the second video signal, or a computing device may classify the second video signal before sending the second video signal to a monitor for display. As described above, a media type may indicate a media source and/or category. Examples of the classification may include television shows and/or movies, video games, productivity applications, communication applications, security applications, Internet content, social media, static content, dynamic content, etc.

In some approaches, the electronic device may classify 104 the received second video signal based on an application indicator(s), based on a source device type and/or identifier, and/or by utilizing a machine learning model or models. For instance, determining the classification may be performed based on an application indicator or indicators. In some examples, the application indicator(s) may be associated with (e.g., mapped to) the classification. For instance, an electronic device may use a received application indicator as the classification (e.g., streaming application, Netflix®, productivity application, etc.) and/or may look up the classification based on a received application indicator (e.g., movie or television show associated with a streaming application). In some examples, the electronic device may store a lookup table that associates that application indicator(s) to the classification.

In some examples, the electronic device may receive a source device type and/or identifier from another electronic device (e.g., second source device) that is providing the second video signal. For instance, the electronic device may receive an EDID and/or DisplayID from another electronic device during enumeration. The source device type and/or identifier may be associated with (e.g., mapped to) the classification. For instance, the EDID for a video doorbell may be associated with a security feed classification. The electronic device may look up the classification based on the source device type and/or identifier (e.g., video game associated with an Xbox® console). In some examples, the electronic device may store a lookup table that associates source device type(s) and/or identifier(s) to the classification(s).

In some examples, an electronic device (e.g., computing device, monitor, etc.) may utilize a machine learning model or models to classify 104 the received second video signal. In some examples, the electronic device may utilize a same machine learning model to classify the received second video signal as the machine learning model used to determine 102 the context. In some examples, the electronic device may utilize a different machine learning model to classify the second video signal. The machine learning model may have been trained to detect objects in an image or images (e.g., video), and/or to classify a scene depicted in an image or images (e.g., video). For example, classifying 104 the received second video signal may include performing, using a machine learning model, object detection on the received second video signal. For instance, the machine learning model may utilize a detected object(s) and/or scenes to determine a media type as described above. The media type for the received second video signal may be the classification.

The electronic device may determine 106 size and location settings based on the context and the classification. A size setting is data (e.g., metadata and/or a parameter) indicating a size (e.g., pixel dimensions) to present the second video signal. For instance, the size may be a "full-screen" size (e.g., display panel dimensions in pixels) or smaller. A location setting is data (e.g., metadata and/or a parameter) indicating a location to present the second video signal. A location setting may be expressed in terms of display panel coordinates. A location setting may be static or relative (e.g., relative to a detected user location, relative to a detected user focal point, relative to a cursor location, relative to a display location of the first video signal, etc.). In some examples, the location setting may be an anchor pixel (e.g., top-left pixel for a window showing the second video signal) and/or a set of pixels (e.g., window) of the display.

The electronic device may utilize the context and the classification to determine the size and location settings. For example, the electronic device may store data (e.g., a lookup table or tables) indicating the size and location settings for various combinations of contexts and classifications. For instance, the data may indicate a size and location to present the second video signal for each combination of context and classification. In some examples, the data may indicate that while in a working context, a video signal classified as a video doorbell feed will have a size (e.g., 400×500 pixels) and will be located in a lower right corner of the display. In some examples, the data may indicate that while in an active entertainment context, a video signal classified as an email notification will have a size (e.g., 200×600 pixels) and will be located in a center left area of the display.

In some examples, the size and location data may be populated, set, and/or modified based on a received input. For instance, if the second video signal has a classification without associated size and location settings for a context, the electronic device may present a message to a user requesting that the user indicate size and location settings for that video signal in that context. The electronic device may receive an input via an input interface(s) (e.g., touchscreen, on-screen display, button(s), remote control receiver, keyboard, captured audio with speech recognition, etc.) indicating the size setting and/or location setting. In some examples, the electronic device may receive an input or inputs from a user indicating the size setting and/or location setting to initially set and/or modify the size setting and/or the location setting. In some examples, default size and/or location settings may be stored and/or utilized. An input may be utilized to confirm the default size and/or location settings or may be utilized to modify the size and/or location settings from the default.

In some examples, determining 106 the size and location settings may include selecting a picture-in-picture (PIP) mode, a picture-by-picture (PBP) mode, or a full-screen mode. For instance, size and locations settings may indicate whether the second video signal is to be presented in full-screen mode (to utilize the whole display, for example), in picture-in-picture mode (as a window with the first video signal in the background, for example), or in picture-by-picture mode (with the second video signal presented next to the first video signal, for example). In some examples, the data (e.g., lookup table or tables) stored on the electronic device may associate the mode (e.g., full-screen, picture-in-picture, or picture-by-picture mode) with a combination of the context and the classification.

In some examples, determining 106 the size and location settings may include determining a display (e.g., display panel and/or display device) to present the second video signal. For instance, some electronic devices may include multiple display panels and/or may be linked to multiple displays. In some examples, determining the size and location settings may include selecting a display that has a nearest detected user proximity (based on the context, for instance). In some examples, multiple displays may include different types of displays (e.g., an LCD display and an e-ink display). Determining 106 the size and location settings may include selecting a display based on the context and/or classification. For instance, if the second video signal is classified as static content, the size and location settings may be utilized to present the second video signal on the e-ink display.

In some examples, multiple size and location settings may correspond to a source device identifier. For example, a source device may produce different classifications and/or media types in some cases. For instance, a computing device may provide video game content, movie content, productivity content, and/or communication content. The multiple size and location settings may be utilized for the different classifications and/or media types received from a source device. In some examples, first size and location settings may correspond to a first classification for a first source device identifier and second size and location settings may correspond to a second classification for the first source device identifier.

In some examples, multiple size and location settings may correspond to different contexts for the same classification and/or source device identifier. The multiple size and location settings may be utilized for the different contexts. In some examples, first size and location settings may correspond to a first context for a first source device identifier and second size and location settings may correspond to a second context for a first source device identifier.

The electronic device may use 108 the size and location settings to cause the second video signal to be presented on a display. Causing the second video signal to be presented may include directly presenting and/or preparing instructions to cause presentation. In some examples where the electronic device is a sink device, the electronic device may display the received second video signal on an integrated display panel. In some examples, the electronic device may send the second video signal to a sink device (e.g., monitor) to display the second video signal on a display panel. In some examples, the electronic device may send the second video signal with the size and location settings to enable a sink device to display the second video signal with the size and location settings. In some examples, the electronic device may generate video frames that are a combination of the first video signal and the second video signal (e.g., the first video signal with the second video signal as picture-in-picture) and may send the generated video frames to a sink device to display the video frames that include the second video signal.

Some of the techniques described herein may provide a practical application or practical applications. For instance, some of the techniques described herein may provide automatic management of multiple video signals, where an electronic device may make intelligent decisions regarding how to concurrently display the video signals based on video signal content. Some of the techniques described herein increase functionality for a computer or computers. For instance, some of the techniques described herein enable a computer to determine size and location settings based on a context indicating a displayed media type of a first video signal and a classification of a second video signal. For example, the size and location settings may vary based on the combination of a context and a classification. The first video signal and the second video signal may be provided from different source devices.

Figure 2:
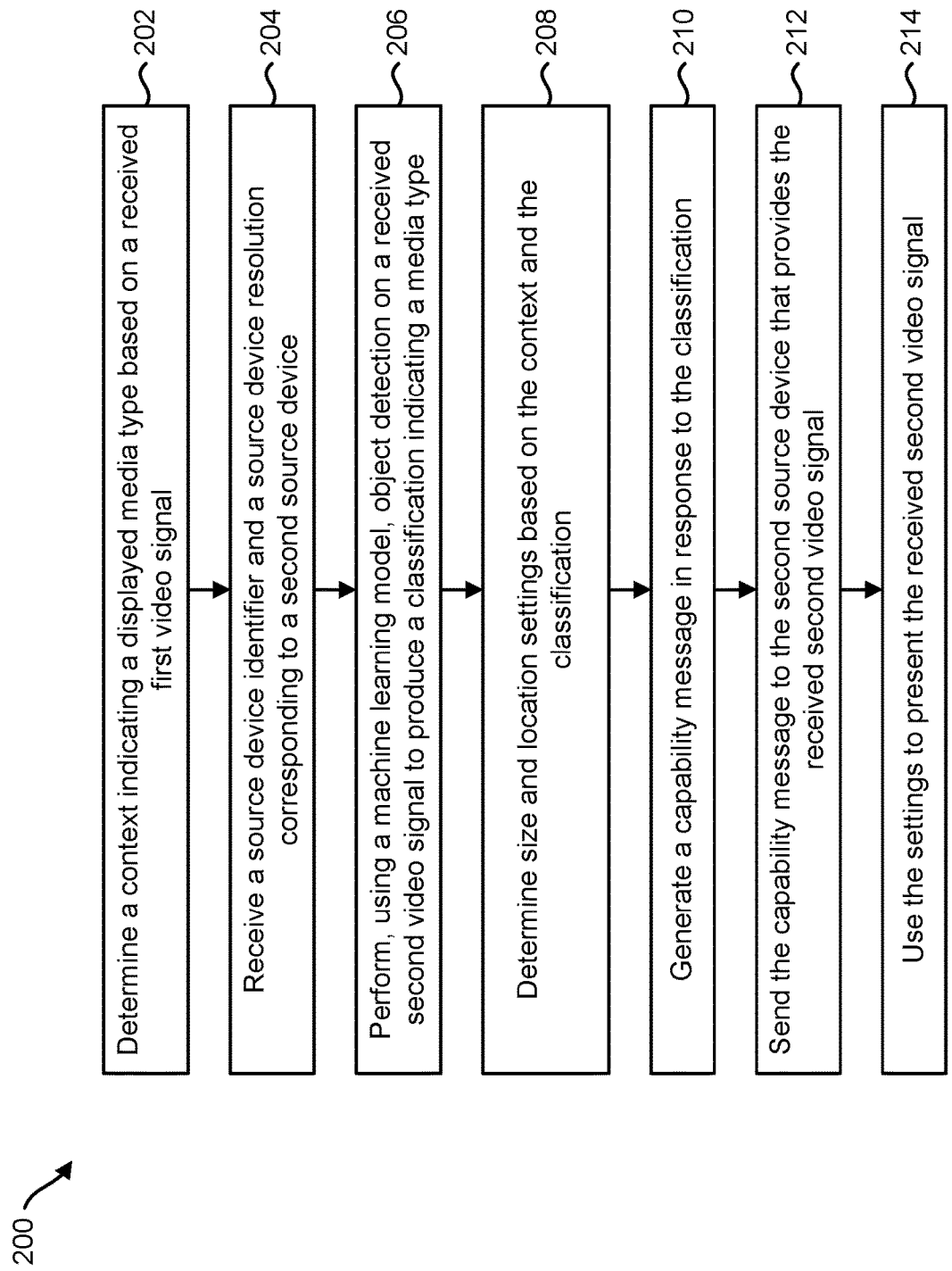
FIG. 2 is a flow diagram illustrating an example of a method for video signal classifications.

FIG. 2 is a flow diagram illustrating an example of a method 200 for video signal classifications. The method 200 and/or a method 200 element(s) may be performed by an electronic device (e.g., source device, sink device, computer, GPU, hub, dock, and/or display, etc.). For instance, the method 200 may be performed by the display device 302 described in relation to FIG. 3.

An electronic device may determine 202 a context indicating a displayed media type based on a received first video signal. In some examples, the electronic device may determine 202 the context as described in relation to FIG. 1. The first video signal may be received from first source device.

The electronic device may receive 204 a source device identifier and a source device resolution corresponding to a second source device. In some examples, receiving 204 a source device identifier and a source device resolution may be performed as described in relation to FIG. 1. For example, the electronic device may enumerate a video link with a second source device. During enumeration, the second source device may send the source device identifier and the source device resolution. In some examples, the source device identifier and the source device resolution may be indicated in EDID, DisplayID, and/or other data sent from the second source device. The source device resolution may indicate a resolution (e.g., pixel dimensions) provided by the second source device (e.g., selected by the second source device, provided by default, and/or a maximum resolution that the second source device is capable of providing).

The electronic device may perform 206, using a machine learning model, object detection on a received second video signal to produce a classification indicating a media type. In some examples, performing object detection using machine learning model of a received second video signal may be performed as described in relation to FIG. 1. For instance, the machine learning model may be trained to detect an object or objects in a frame or frames of video. In some examples, the machine learning model may be trained with training images that depict objects (e.g., user interfaces corresponding to different applications, text, video game objects, and/or streaming service logos, etc.) that may indicate an application and/or media type corresponding to the second video signal.

The electronic device may determine 208 size and location settings based on the context and the classification. In some examples, determining 208 the size and location settings may be performed as described in relation to FIG. 1. In some examples, determining 208 the size and location settings may be based on the source device identifier and/or the source device resolution. For instance, the electronic device may look up a set of media types corresponding to source device identifier. For instance, the source device identifier may indicate that the source device is a personal computer. A personal computer may output a media type or types (e.g., movie, video game, virtual meeting, email interface, and/or word processor interface, etc.). The electronic device may utilize the classification that indicates a media type depicted in the second video signal. In some examples, the classification in combination with the source device identifier may be associated with particular size and location settings. For instance, an email notification from a personal computer may have associated first size and location settings (e.g., picture-in-picture in a lower right hand corner of the display), whereas a virtual meeting from the personal computer may have associated second size and location settings (e.g., picture-by-picture on the right side of the display).

In some examples, the electronic device may determine the location and/or size settings based on the source device resolution. For instance, the electronic device may select a window size to accommodate the source device resolution at a location that would allow the second video signal to be displayed. In some examples, the electronic device may scale (e.g., upscale or downscale) the second video signal to fit the size setting (e.g., to maintain aspect ratio).

In some examples, the electronic device may change the resolution of the second video signal from the second source device. For instance, if the second video signal has a resolution that will not fit within a determined size setting, the electronic device may report a capability message to the second source device to cause the second source device to reduce the resolution of the second video signal. In some examples, the electronic device may perform video processing (e.g., upscaling and/or downscaling) on the second video signal to align the second video signal in accordance with the size and/or location settings (e.g., currently operative resolution).

In some examples, the electronic device may generate 210 a capability message in response to the classification. Examples of the capability message may be an EDID message or DisplayID message. For instance, the electronic device may generate a capability message (e.g., EDID, DisplayID, timing(s), etc.) indicating a different resolution (e.g., lesser resolution, resolution corresponding to the size setting, etc.) than the default resolution (e.g., pixel raster) of the display.

The electronic device may send 212 the capability message to the second source device that provides the received second video signal. For instance, the electronic device may send 212 the capability message via a video link and/or a side link. The capability message may cause the second source device to re-enumerate the video link between the second source device and the electronic device. For instance, the capability message may indicate a resolution that is different from (e.g., less than) a default resolution of a display device to present the received second video signal. The second source device may utilize the capability message to adjust the resolution of the second video signal provided by the second source device to the resolution (e.g., non-default resolution) indicated by the capability message.

The electronic device may use 214 the size and location settings to present the received second video signal. In some examples, the electronic device may use 214 the size and location settings to present the received second video signal as described in relation to FIG. 1. For instance, the electronic device may present the received second video signal on an integrated display panel using the size and location settings or may send the received second video signal to a linked display device to display the second video signal with the size and location settings.

Figure 3:
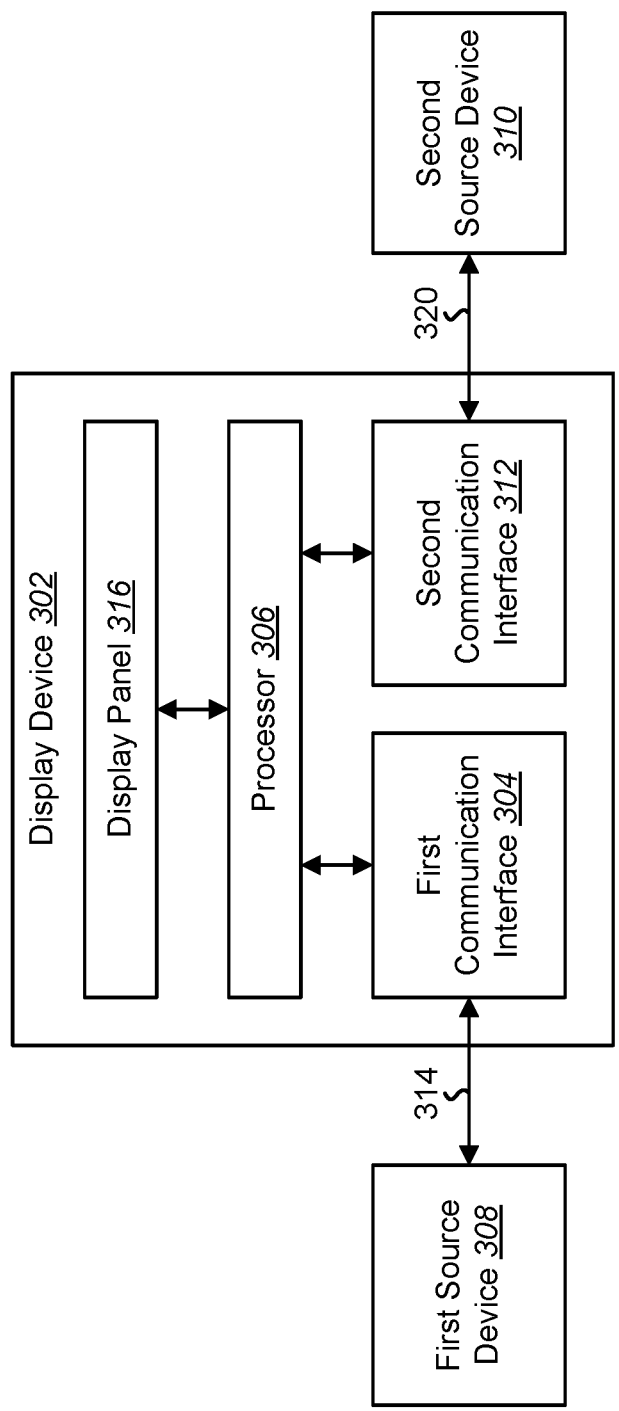
FIG. 3 is a block diagram of an example of a display device that may be used to perform video signal classifications.

FIG. 3 is a block diagram of an example of a display device 302 that may be used to perform video signal classifications. Examples of the display device 302 may include a monitor, smart display, television, tablet device, smartphone, projector, etc. The display device 302 may be an example of the electronic device(s) described in relation to FIG. 1 and/or FIG. 2. In some examples, the display device 302 may perform a method or methods (e.g., method 100 and/or method 200) and/or an operation or operations described herein. The display device 302 may be linked to a first source device 308 and to a second source device 310 in some examples. The display device 302 may be linked to an additional source device or devices in some examples.

An example of a first source device 308 is also illustrated in FIG. 3. A first source device 308 is a device that generates, produces, provides, and/or outputs video (e.g., a video stream, video frames, etc.). Examples of the first source device 308 may include a computing device, GPU, audio/video (AV) receiver, smartphone, laptop computer, media player, game console, television stick, media receiver, media drive, media server, video doorbell, etc. The first source device 308 may be an example of the source device or source devices described herein.

The first source device 308 may be linked to the display device 302 with a first link 314. The first link 314 may be a wired or wireless link. In some examples, a wired link (e.g., cable) may include multiple wires and/or pins. The first link 314 may provide a channel or channels (e.g., data link, auxiliary channel, and/or connection detection channel, etc.) for communication. A channel may be a physical channel (e.g., wire) and/or a logical channel (e.g., frequency domain and/or time domain resources, multiplexed channel, etc.). More or fewer channels, links, and/or cables may be used in some examples.

In some examples, the first source device 308 may include transmission circuitry and/or reception circuitry. The first link 314 may be provided by and/or connected to the transmission circuitry and/or reception circuitry of the first source device 308.

In some examples, the auxiliary channel may carry information and/or messages to set up a first video link (e.g., to perform enumeration) between the first source device 308 and the display device 302. For instance, the auxiliary channel may carry a request or requests (e.g., identification request(s), setup data request(s), link training request(s), and/or timing data request(s), etc.), display data (e.g., DisplayID and/or EDID), setup data (e.g., DPCD), link training data, and/or timing data, etc.

In some examples, the data link may carry a first video signal (e.g., a video stream and/or video frames) from the first source device 308 to the display device 302. Once the first link 314 is set up, for instance, the data link of the first link 314 may carry the first video signal to the display device 302.

An example of a second source device 310 is also illustrated in FIG. 3. The second source device 310 is a device that generates, produces, provides, and/or outputs video (e.g., a video stream, video frames, etc.). Examples of the second source device 310 may include a computing device, GPU, AV receiver, smartphone, laptop computer, media player, game console, television stick, media receiver, media drive, media server, video doorbell, etc. The second source device 310 may be an example of the source device or source devices described herein.

The second source device 310 may be linked to the display device 302 with a second link 320. The second link 320 may be a wired or wireless link. In some examples, a wired link (e.g., cable) may include multiple wires and/or pins. The second link 320 may provide a channel or channels (e.g., data link, auxiliary channel, and/or connection detection channel, etc.) for communication.

In some examples, the second source device 310 may include transmission circuitry and/or reception circuitry. The second link 320 may be provided by and/or connected to the transmission circuitry and/or reception circuitry of the second source device 310.

In some examples, the auxiliary channel may carry information and/or messages to set up a second video link (e.g., to perform enumeration) between the second source device 310 and the display device 302. For instance, the auxiliary channel may carry a request or requests (e.g., identification request(s), setup data request(s), link training request(s), and/or timing data request(s), etc.), display data (e.g., DisplayID and/or EDID), setup data (e.g., DPCD), link training data, and/or timing data, etc.

In some examples, the data link may carry a second video signal (e.g., a video stream and/or video frames) from the second source device 310 to the display device 302. Once the second link 320 is set up, for instance, the data link of the second link 320 may carry the second video signal to the display device 302.

The display device 302 is a device that includes a display (e.g., display panel 316). The display device 302 may be an example of a sink device. For example, the display device 302 may receive and/or display video (e.g., a video stream, video frames, etc.).

The display device 302 may include a display panel 316, a processor 306, a first communication interface 304, and/or a second communication interface 312. The display panel 316 is circuitry to display optical information. Examples of the display panel 316 may include organic light-emitting diode (OLED) display panels, light-emitting diode (LED) liquid crystal display (LCD) panels, microLED panels, miniLED panels, etc. The display panel 316 may display a video signal or video signals (e.g., the first video signal and/or the second video signal). The processor 306 is circuitry to control the display device 302. In some examples, the processor 306 may be a scaler, application-specific integrated circuit (ASIC), and/or other circuitry. In some examples, the processor 306 may include memory and/or may have access to memory included in the display device 302. For instance, the processor 306 may read and/or execute instructions stored in memory to perform an operation or operations (e.g., method 100, method 200, and/or operation(s) thereof) described herein.

The first communication interface 304 is circuitry to communicate with a source device (e.g., the first source device 308). The first communication interface 304 may be a wired and/or wireless communication interface (e.g., Wi-Fi communication interface, Bluetooth communication interface, cellular communication interface, etc.). In some examples, the first communication interface 304 may include a port or ports and corresponding circuitry to support a video link or links. For instance, some ports may be utilized to link to a device (e.g., the first source device 308) that may be external to the display device 302. Examples of ports with supporting circuitry may include a Universal Serial Bus (USB) interface (e.g., USB Type-C® (USB-C®), USB Type-A, USB Type-B, USB 2.0, USB 3.0, USB Mini-B, USB Micro-B, etc.), Lightning® interface, Ethernet interface, DisplayPort® interface, HDMI" interface, etc. In some examples, the first communication interface 304 may include a port, transceiver circuitry, and/or an interface controller. For instance, the first communication interface 304 may enable receiving video for display on the display device 302. In some examples, the first communication interface 304 may receive a first video signal (from the first source device 308, for instance).

The second communication interface 312 is circuitry to communicate with a source device (e.g., the second source device 310). The second communication interface 312 may be a wired and/or wireless communication interface. In some examples, the second communication interface 312 may include a port or ports and corresponding circuitry to support a video link or links. For instance, some ports may be utilized to link to a device (e.g., the second source device 310) that may be external to the display device 302. In some examples, the second communication interface 312 may include a port, transceiver circuitry, and/or an interface controller. For instance, the second communication interface 312 may enable receiving video for display on the display device 302. In some examples, the second communication interface 312 may receive a second video signal (from the second source device 310, for instance).

In some examples, the processor 306 may determine a displayed media type of the first video signal. For instance, determining the displayed media type of the first video signal may be performed as described in relation to FIG. 1 and/or FIG. 2.

In some examples, the processor 306 may determine a media type of the second video signal. For instance, determining the media type of the second video signal may be performed as described in relation to FIG. 1 and/or FIG. 2.

In some examples, the processor 306 may determine settings to present the second video signal based on the displayed media type (of the first video signal, for instance) and the media type (of the second video signal, for instance). For instance, determining settings (e.g., size and location settings) may be performed as described in relation to FIG. 1 and/or FIG. 2. In some examples, the displayed media type (from the first source device 308, for instance) is computing device video over a wired link, the media type (from the second source device 310, for instance) is a video doorbell feed over a wireless link, and the settings indicate a picture-in-picture mode.

In some examples, the display device 302 may include a proximity sensor. A proximity sensor is a sensor to determine whether a person (e.g., user) is within a range (e.g., spatial range, distance) of the display device 302. Examples of the proximity sensors may include optical cameras, time-of-flight (TOF) cameras, ultrasound sensors, speakers and microphones, etc. The proximity sensor may produce a user proximity measure. The user proximity measure may indicate a distance to a user (if any) and/or may indicate whether a user is within a threshold range or ranges (e.g., within 20 feet, 15 feet, 10 feet, 5 feet, 3 feet, 2 feet, 12 inches, etc.).

In some examples, the processor 306 may determine the settings based on the user proximity measure. In some examples, the user proximity measure may be utilized to determine a context, which may be utilized to determine the settings. For instance, the size setting may be increased with increasing user distance. In some examples, a larger mode (e.g., full-screen mode or picture-by-picture mode) may be selected if the user is greater than a threshold distance from the display device and/or is beyond a threshold range. This approach may aid the user in seeing the second video signal when the user is located at a greater distance from the display device. For instance, a user may ask a voice assistant to show a video, where the voice assistant provides the second video signal. The proximity measure may be utilized to determine that the user is greater than a threshold distance from the display device and a larger mode (e.g., picture-by-picture mode, full-screen mode) may be selected. In some examples, a capability message (e.g., EDID) may be issued with a greater resolution (e.g., resolution of a picture-by-picture window, full display device resolution). In some examples, the processor 306 may select and/or use a picture-in-picture mode if the user is within 5 feet from the display device 302, a picture-by-picture mode if the user is greater than 5 feet (and less than 10 feet) from the display device 302, or a full-screen mode if the user is greater than 10 feet from the display device 302. Other approaches and/or functions may be utilized. For instance, a function that maps increasing user distance to an increasing size setting may be utilized.

In some examples, the processor 306 may determine the settings based on user activity detection. In some examples, the activity detection may be utilized to determine a context, which may be utilized to determine the settings. For instance, the size setting may be increased with decreasing detected user activity. In some examples, a video buffer may be monitored (on a sink device such as the display device 302 and/or a source device) to detect user activity (e.g., moving cursor, user interface interaction, etc.). In some examples, the location of the cursor may be included in a determined context. Detected user activity may indicate that a user is nearer to the display device 302, while lesser or no detected user activity may indicate that a user is further from the display device 302. A larger mode (e.g., picture-by-picture mode, full-screen mode) may be selected and/or a capability message (e.g., EDID) may be issued with a greater resolution (e.g., resolution of a picture-by-picture window, full display device resolution) if lesser or no user activity is detected. In some examples, the processor 306 may select and/or use a picture-by-picture mode if infrequent user activity is detected (e.g., less than two detected user interactions in the last five minutes) or a full-screen mode if no user activity is detected (e.g., zero detected user interactions in the last five minutes). In some examples, the second video signal may be located relative to cursor location (e.g., located away from the cursor, located at a displacement from the cursor, etc.). Some of the techniques described herein may enable a sink device (e.g., the display device 302) to operate as an OS-agnostic video display hub.

Figure 4:
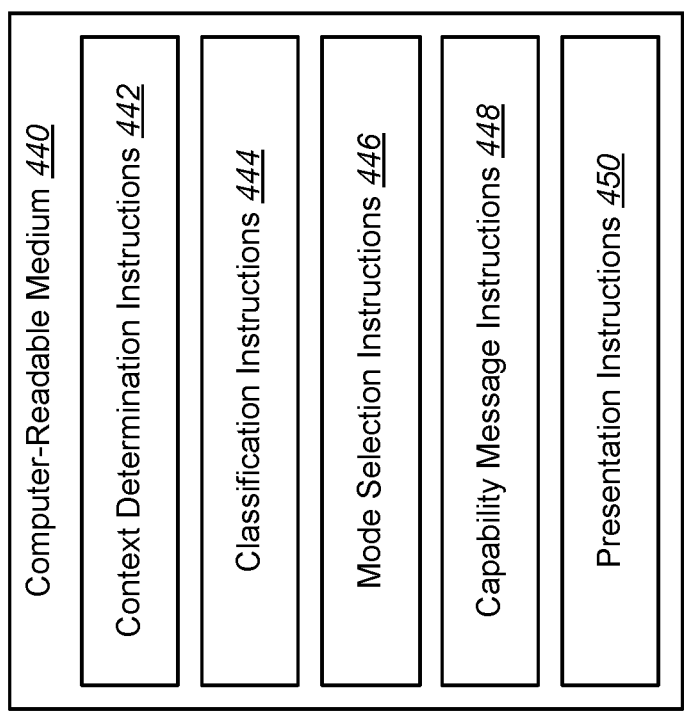
FIG. 4 is a block diagram illustrating an example of a computer-readable medium for video signal classifications.

FIG. 4 is a block diagram illustrating an example of a computer-readable medium 440 for video signal classifications. The computer-readable medium 440 may be a non-transitory, tangible computer-readable medium. The computer-readable medium 440 may be, for example, RAM, EEPROM, a storage device, an optical disc, and/or the like. In some examples, the computer-readable medium 440 may be volatile and/or non-volatile memory, such as DRAM, EEPROM, magnetoresistive random-access memory (MRAM), phase-change random-access memory (PCRAM), memristor, flash memory, and/or the like. In some examples, the computer-readable medium 440 may be included in a computing device and/or accessible to a processor of a computing device.

The computer-readable medium 440 may include code (e.g., data, executable instructions, and/or executable code). For example, the computer-readable medium 440 may include context determination instructions 442, classification instructions 444, mode selection instructions 446, capability message instructions 448, and/or presentation instructions 450.

In some examples, the context determination instructions 442 may be instructions when executed cause a processor (e.g., processor of a computing device) to determine a context indicating a first media type of a first video signal produced by the computing device. In some examples, the processor may determine the context as described in relation to FIG. 1 and/or FIG. 2. For instance, the processor may get an application indicator of an application executed by the computing device to produce the first video signal.

In some examples, the classification instructions 444 may be instructions that when executed cause a processor (e.g., a processor of the computing device) to classify a second video signal received from a source device to produce a classification indicating a second media type. In some examples, the processor may classify the second video signal as described in relation to FIG. 1 and/or FIG. 2. For instance, the processor may classify the second video signal based on a received source device identifier, based on a received application identifier, and/or based on machine learning object detection and/or scene detection.

In some examples, the mode selection instructions 446 may be instructions that when executed by a processor (e.g., a processor of the computing device) select a mode for display. For example, the processor may select a picture-in-picture mode with size and location settings based on the context and the classification. For instance, the mode may be selected as described in relation to FIG. 1 and/or FIG. 2.

In some examples, the capability message instructions 448 are instructions that when executed cause a processor (e.g., a processor of the computing device) to send a capability message to the source device indicating a capability corresponding to the size setting. For instance, the processor may send the capability message as described in relation to FIG. 1 and/or FIG. 2. In some examples, the size setting is different from a size of a display panel. In some examples, the capability message is a generated EDID message that is different from a default EDID (e.g., pixel raster) of a display device to present the first video signal and the second video signal.

In some examples, the presentation instructions 450 are instructions that when executed cause a processor (e.g., a processor of the computing device) to present the second video signal as a picture-in-picture with the first video signal. For instance, the processor may send the first video signal and the second video signal to a display device in accordance with the settings as described in relation to FIG. 1 and/or FIG. 2.

Some examples of the techniques described herein may enable viewing of video and/or notification content from multiple sources. Some examples of the techniques may provide handling of different video sources to increase the convenience of picture-in-picture and/or picture-by-picture features. For instance, settings for handling multiple sources may be initially set from a user input when a combination of video sources occurs. In some approaches, further user input (e.g., on-screen display navigation) for the combination may be reduced or eliminated after the initial setup. In some examples, a source device or devices may issue display commands to a sink device (e.g., monitor), and the sink device may interpret and/or modify video display commands received from the source device(s) in accordance with user preferences and/or depending on the sink device. In some examples with multiple sink devices (e.g., display devices), each display device may display video received in relation to a most active display device to reduce distraction.

A technique or techniques, a method or methods (e.g., method(s) 100 and/or 200) and/or an operation or operations described herein may be performed by (and/or on) a sink device, a source device, and/or a device that is a sink device and a source device. For instance, a video signal may be classified on a source device and/or on a sink device. For instance, a technique or techniques described herein may be performed on a computer, GPU, hub, dock, and/or display device, etc. In some examples, a source device and/or a sink device may include circuitry (e.g., a processor with instructions and/or connection interface circuitry) to perform a technique or techniques described herein.

As used herein, the term "and/or" may mean an item or items. For example, the phrase "A, B, and/or C" may mean any of: A (without B and C), B (without A and C), C (without A and B), A and B (but not C), B and C (but not A), A and C (but not B), or all of A, B, and C.

While various examples are described herein, the disclosure is not limited to the examples. Variations of the examples described herein may be within the scope of the disclosure. For example, aspects or elements of the examples described herein may be omitted or combined.

The invention claimed is:

1. A method, comprising:
   producing, by a proximity sensor, a user proximity measure;

receiving, by a display device, a first video signal and a second video signal;

determining, by a processor in the display device, a context indicating a displayed media type based on the received first video signal;

classifying, by the processor, the received second video signal to produce a classification of the received second video signal indicating a media type of the received second video signal;

determining, by the processor, size and location settings based on:
- the user proximity measure,
- the context, and
- the classification; and causing, by the processor in response to using the size and location settings, the second video signal to be presented on the display device.

2. The method of claim 1, wherein determining the size and location settings comprises selecting a picture-in-picture mode, a picture-by-picture mode, or a full-screen mode.

3. The method of claim 1, wherein determining the size and location settings is based on a source device identifier and a source device resolution.

4. The method of claim 1, wherein multiple size and location settings correspond to a first source device identifier.

5. The method of claim 4, wherein first size and location settings correspond to a first classification for the first source device identifier and second size and location settings correspond to a second classification for the first source device identifier.

6. The method of claim 1, wherein first size and location settings correspond to a first context for a first source device identifier and second size and location settings correspond to a second context for the first source device identifier.

7. The method of claim 1, further comprising:
generating a capability message in response to the classification; and
sending the capability message to a source device that provides the received second video signal.

8. The method of claim 7, wherein the capability message indicates a resolution that is different from a default resolution of a display device to present the received second video signal.

9. The method of claim 1, wherein classifying the received second video signal comprises performing, using a machine learning model, object detection on the received second video signal.

10. The method of claim 1, wherein the proximity sensor is a sensor to determine whether a user is within a range of the display device.

11. The method of claim 10, wherein the user proximity measure indicates a distance of the user to the display device.

12. A display device comprising:
a first communication interface to receive a first video signal;
a display panel to display the first video signal;
a second communication interface to receive a second video signal;
a proximity sensor to produce a user proximity measure; and
a processor, wherein the processor is to;
determine a displayed media type of the first video signal,
determine a media type of the second video signal,
determine settings to present the second video signal based on the displayed media type and the media type, and
determine the settings based on the user proximity measure.

13. The display device of claim 12, wherein the displayed media type is computing device video over a wired link, the media type is a video doorbell feed over a wireless link, and the settings indicate a picture-in-picture mode.

14. The display device of claim 12, wherein the proximity sensor is a sensor to determine whether a user is within a range of the display device.

15. The display device of claim 14, wherein the user proximity measure indicates a distance of the user to the display device.

16. A non-transitory tangible computer-readable medium comprising instructions when executed cause a processor to:
determine a context indicating a first media type of a first video signal produced by a computing device;
classify a second video signal received from a source device to produce a classification indicating a second media type;
select a picture-in-picture mode with size and location settings based on the context and the classification;
send a capability message to the source device indicating a capability corresponding to the size setting; and
present the second video signal as a picture-in-picture with the first video signal,
wherein the capability message is a generated extended display identification (EDID) message that is different from a default EDID of a display device to present the first video signal and the second video signal.

17. The non-transitory tangible computer-readable medium of claim 16, wherein the size setting is different from a size of a display panel.

* * * * *